(12) United States Patent
Berro

(10) Patent No.: US 12,643,422 B2
(45) Date of Patent: Jun. 2, 2026

(54) ELECTRIC BICYCLE SELF-RECHARGING SYSTEM

(71) Applicant: David Michael Berro, Windsor (CA)

(72) Inventor: David Michael Berro, Windsor (CA)

( * ) Notice: Subject to any disclaimer, the term of this patent is extended or adjusted under 35 U.S.C. 154(b) by 0 days.

(21) Appl. No.: 19/040,734

(22) Filed: Jan. 29, 2025

(65) Prior Publication Data

US 2025/0303903 A1 Oct. 2, 2025

Related U.S. Application Data

(60) Provisional application No. 63/573,341, filed on Apr. 2, 2024.

(51) Int. Cl.
| | |
|---|---|
| *B60L 53/57* | (2019.01) |
| *B62J 43/13* | (2020.01) |
| *B62J 43/28* | (2020.01) |
| *B62M 6/40* | (2010.01) |
| *H02J 7/24* | (2006.01) |

(52) U.S. Cl.
CPC ............... *B60L 53/57* (2019.02); *B62J 43/13* (2020.02); *B62J 43/28* (2020.02); *H02J 7/24* (2013.01); *B60L 2200/12* (2013.01); *B60L 2210/30* (2013.01); *B62M 6/40* (2013.01)

(58) Field of Classification Search
CPC .. B60L 53/57; B60L 2200/12; B60L 2210/30; B62J 43/13; B62J 43/28; H02J 7/24; B62M 6/40

USPC .................................................. 307/9.1, 10.1
See application file for complete search history.

(56) References Cited

U.S. PATENT DOCUMENTS

| | | | |
|---|---|---|---|
| 7,960,848 | B2 | 6/2011 | Tsai |
| 10,710,675 | B2 | 7/2020 | Park |
| 2011/0001442 | A1 | 1/2011 | Lee et al. |
| 2020/0198726 | A1 | 6/2020 | Bin |

FOREIGN PATENT DOCUMENTS

CN 109466685 A 3/2019

*Primary Examiner* — Hal Kaplan

(57) ABSTRACT

The electric bicycle self-recharging system is intended to provide continuous generation of electricity from the rotation of an electric bicycle's wheel to recharge the electric battery. To accomplish this, a permanent magnet generator is rotatably connected to the corresponding wheel of the electric bicycle using a belt that transfers the torque from the wheel to the permanent magnet generator. The generated Alternating Current (AC) electricity is then converted into Direct Current (DC) electricity which can be used to recharge the electric bicycle's battery while the electric bicycle is in motion. The user can also opt to not recharge the electric bicycle's battery but to only recharge a secondary battery while the electric bicycle is in motion. The secondary battery enables the recharging of the electric bicycle's battery when the electric bicycle is not in motion. Furthermore, the system provides various safety features that protect the electric bicycle and the user.

11 Claims, 5 Drawing Sheets

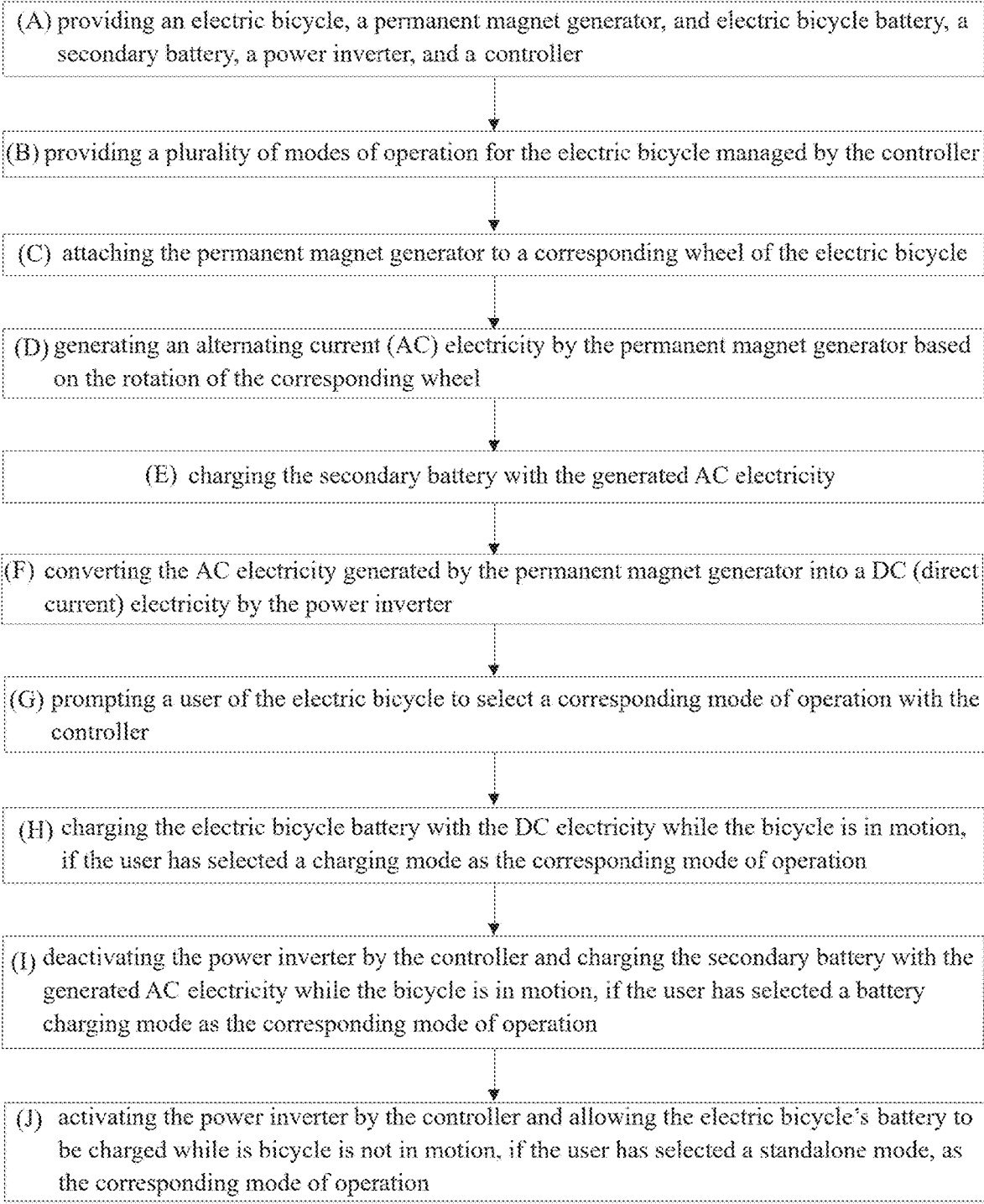

(A) providing an electric bicycle, a permanent magnet generator, and electric bicycle battery, a secondary battery, a power inverter, and a controller (B) providing a plurality of modes of operation for the electric bicycle managed by the controller (C) attaching the permanent magnet generator to a corresponding wheel of the electric bicycle (D) generating an alternating current (AC) electricity by the permanent magnet generator based on the rotation of the corresponding wheel (E) charging the secondary battery with the generated AC electricity (F) converting the AC electricity generated by the permanent magnet generator into a DC (direct current) electricity by the power inverter (G) prompting a user of the electric bicycle to select a corresponding mode of operation with the controller (H) charging the electric bicycle battery with the DC electricity while the bicycle is in motion, if the user has selected a charging mode as the corresponding mode of operation (I) deactivating the power inverter by the controller and charging the secondary battery with the generated AC electricity while the bicycle is in motion, if the user has selected a battery charging mode as the corresponding mode of operation (J) activating the power inverter by the controller and allowing the electric bicycle's battery to be charged while is bicycle is not in motion, if the user has selected a standalone mode, as the corresponding mode of operation

FIG. 2

ELECTRIC BICYCLE SELF-RECHARGING SYSTEM

FIELD OF THE INVENTION

The present invention relates generally to transportation devices and power generation systems. More specifically, the present invention discloses a power generation system that can power up the operation of an electric bicycle while the bicycle is in operation.

BACKGROUND OF THE INVENTION

Electric transportation devices have become a very popular alternative to the traditional transportation devices that are powered by an internal combustion engine. This is notable with the recent trend of electric vehicles rising in popularity. Electric transportation devices provide a more ecofriendly alternative, and can be better suitable for smaller scale applications, such as in scooters or bicycles. Different electric bicycles have been made available that enable users to travel greater distances with less effort. In general, electric bicycles are equipped with an electric motor powered by an electrical battery. Most electric bicycles can be recharged using power from an external electric utility. This allows users to recharge electric bicycles when not in use. In addition, some electric bicycles have been developed that allow for recharging of the bicycle's electric battery during operation using regenerative power systems. Most of these systems allow for the generation of power by converting thermal energy generated by the bicycle's operation into electrical energy. For example, a great amount of heat is generated when the user is decelerating the bicycle using the bicycle's brakes. This heat generated is then converted into electrical power which recharges the electric battery to further power the bicycle's electric motor. While these systems are generally useful, these systems can generate limited power depending on the heat generated during the bicycle's deceleration periods. Users are still required to recharge the electric batteries using external electrical utilities. So, a regenerative system that allows for greater power regeneration from the corresponding bicycle operation is necessary.

An objective of the present invention is to disclose an electric bicycle self-recharging system. The present invention is designed to provide continuous charge to the electric bicycle's electric battery while in motion. In addition, the present invention can also provide charge while the electric bicycle is not in motion. Another objective of the present invention is to disclose an electric bicycle self-recharging system that utilizes an electric bicycle's wheel rotation to generate electricity which is used to recharge the electric battery. The present invention utilizes the rotation of a wheel of the electric bicycle to generate electricity instead of converting thermal energy from the electric bicycle's brakes. This allows the present invention to generate greater continuous electricity that can be used to recharge the electric battery. Another objective of the present invention is to provide an electric bicycle self-recharging system that can be controlled by the user directly on the electric bicycle. The present invention allows the user to control different functions of the system, such as controlling when the system is active while moving or when stationary. Additional features and benefits of the present invention are further discussed in the sections below.

SUMMARY OF INVENTION

The present invention discloses an electric bicycle self-recharging system. The present invention is designed to allow the continuous generation of electricity from the rotation of an electric bicycle's wheel to recharge the electric battery. To do so, the present invention preferably utilizes a permanent magnet generator that is rotatably connected to the corresponding wheel of the electric bicycle. For example, the permanent magnet generator can be connected to the wheel using a belt that transfers the torque from the wheel to the permanent magnet generator. The generated Alternating Current (AC) electricity is then converted into Direct Current (DC) electricity which can be used to recharge the electric bicycle's battery.

In some embodiments, the present invention can enable the user to enable the direct recharging of the electric bicycle's battery from the generated electricity while the electric bicycle is in motion. The user can also opt to not recharge the electric bicycle's battery but to only recharge a secondary battery while the electric bicycle is in motion. The secondary battery enables the recharging of the electric bicycle's battery when the electric bicycle is not in motion. This way, the present invention allows the user to recharge electric bicycles while in motion and when not in motion for continuous recharging. The present invention also provides various safety features that protect the electric bicycle and the user.

BRIEF DESCRIPTION OF THE DRAWINGS

FIG. 2 is a flowchart showing the overall process of the operation of the present invention.

DETAILED DESCRIPTION OF THE INVENTION

Figure 1:
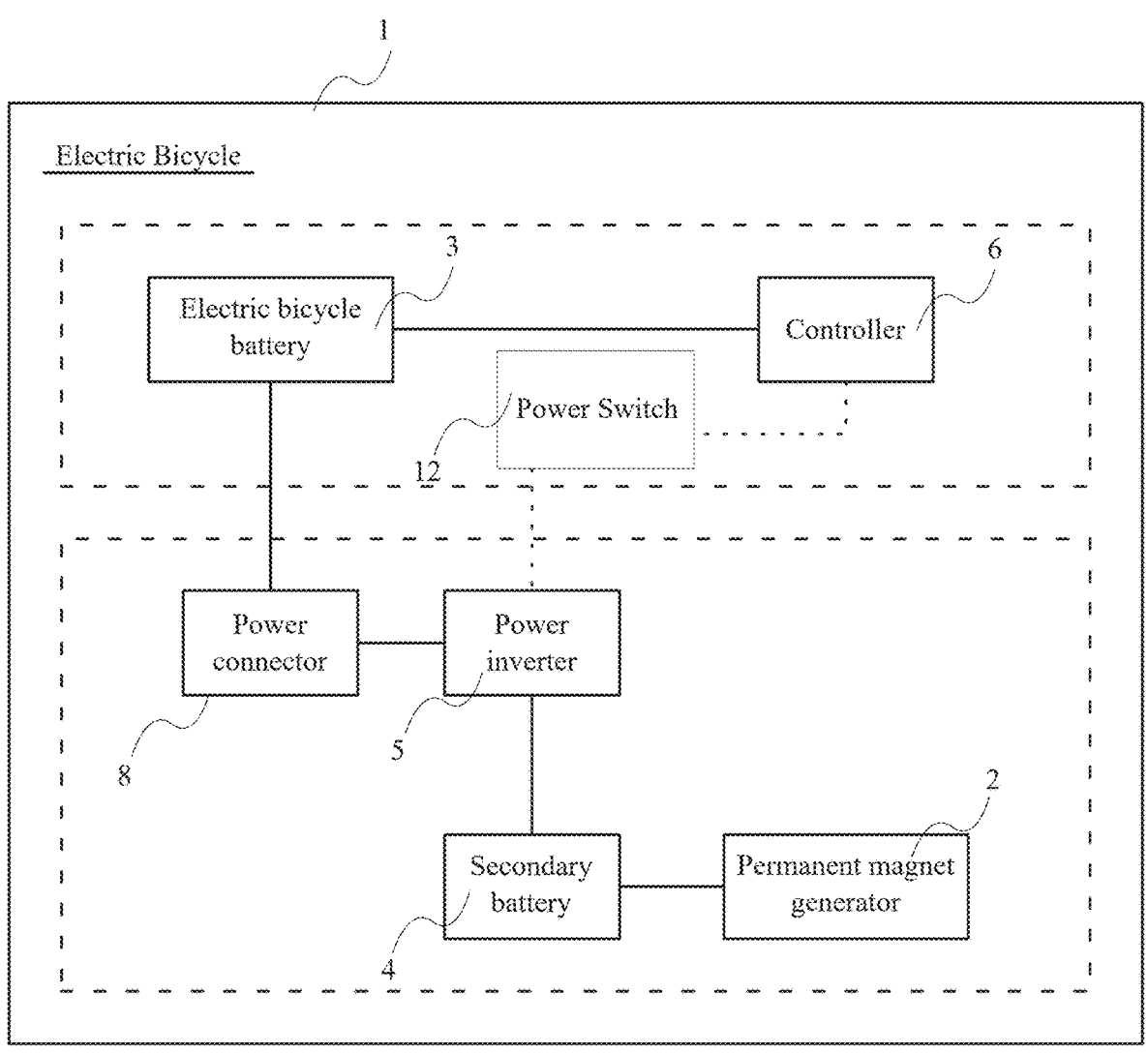
FIG. 1 is a schematic view showing the electronic and the electrical connections of the present invention, wherein the electronic connections are shown in dotted lines, and wherein the electrical connections are shown in solid lines.

All illustrations of the drawings are for the purpose of describing selected versions of the present invention and are not intended to limit the scope of the present invention.

The present invention discloses an electric bicycle self-recharging system. The present invention is designed to enable the recharging of an electric bicycle's battery for prolonged periods of time. The following description is in reference to FIG. 1 through FIG. 5.

According to the preferred embodiment, a self-charging system and a preferred method of operation of the system comprises the following steps. As can be seen in FIG. 2, the overall method comprises providing an electric bicycle 1, a permanent magnet generator 2, an electric bicycle battery 3, a secondary battery 4, a power inverter 5, and a controller 6 (Step A). Preferably, the system of the present invention can be integrated into the electric bicycle's frame during manufacturing or provided as a retrofittable product. In other words, the electric bicycle battery 3, the secondary battery 4, the power inverter 5, and the controller 6 are mounted within a frame of the electric bicycle 1. According to the preferred embodiment, the permanent magnet generator 2 allows for the generation of Alternating Current (AC) from the rotation of a wheel of the electric bicycle. Further, the secondary battery 4 can store the generated AC electricity to allow the recharging of the electric bicycle's battery in a standalone mode (i.e., when the electric bicycle is not in motion). The power inverter 5 converts the generated AC electricity into Direct Current (DC) electricity which can be used to recharge the electric bicycle's battery 3. Preferably, the electric bicycle battery 3 is the main battery that runs the electric bicycle 1. Furthermore, the controller 6 allows the user to switch between modes of operation of the system. Accordingly, the overall method continues by providing a plurality of modes of operation for the electric bicycle 1 managed by the controller 6 (Step B).

As previously mentioned, the permanent magnet generator 2 allows for the generation of AC from the rotation of a wheel of the electric bicycle. Thus, the overall method continues by attaching the permanent magnet generator 2 to a corresponding wheel 7 of the electric bicycle 1, wherein the permanent magnet generator 2 is rotatably connected to the corresponding wheel 7 (Step C). In other words, the permanent magnet generator 2 is designed to convert the rotating motion of a wheel of the electric bicycle into electrical power to generate AC electricity. To do so, the permanent magnet generator 2 is rotatably connected to the corresponding wheel 7. More specifically, the permanent magnet generator 2 is mounted onto a section of the electric bicycle's frame adjacent to the corresponding wheel 7. Thus, the overall method continues by generating an alternating current (AC) electricity by the permanent magnet generator 2 based on the rotation of the corresponding wheel 7 (Step D). As can be seen in FIG. 1 through 5, the secondary battery 4 is also mounted onto the electric bicycle's frame and is electrically connected to the permanent magnet generator 2. This way, the generated AC electricity can be stored in the secondary battery 4 if the generated AC electricity is not charging the electric bicycle's battery 3 when the electric bicycle 1 is in motion or stationary. In other words, the overall method continues by charging the secondary battery 4 with the generated AC electricity, wherein the secondary battery 4 is electrically connected to the permanent magnet generator 2 and the power inverter 5 (Step E). Preferably, the secondary battery 4 can be a 12 Volts (V), 20 Ampere-per-hour (Ah), 55-ampere (amp) battery.

The overall method further continues by converting the AC electricity generated by the permanent magnet generator 2 into DC (direct current) electricity by the power inverter 5 (Step F). The secondary battery 4 is electrically connected to the power inverter 5 so that the generated AC electricity is converted into DC electricity before flowing to the electric bicycle's battery 3. More specifically, the secondary battery 4 is continuously charged while the permanent magnet generator 2 is generating AC electricity. For example, the permanent magnet generator 2 can include a 2000-watt (W) motor. When the system is recharging the electric bicycle's battery 3, the secondary battery 4 is charged at a slower rate. The power inverter 5 can be a 1500 W power inverter which can be fused or have overload protection for safety. In some embodiments, the secondary battery 4 can be electrically connected to the power inverter 5 via a breaker switch to further protect the system from overcurrent. In other embodiments, different safety devices can be implemented to increase the efficiency and the safety of the system.

However, it should be noted that the permanent magnet generator 2, the power inverter 5 and the secondary battery 4 may comprise any other specifications, as long as the intents of the present invention are not altered. The general configuration of the aforementioned components allows the user to drive an electric bicycle 1 for prolonged periods without having to recharge the electric bicycle's battery 3 with an external power source.

Figure 3:
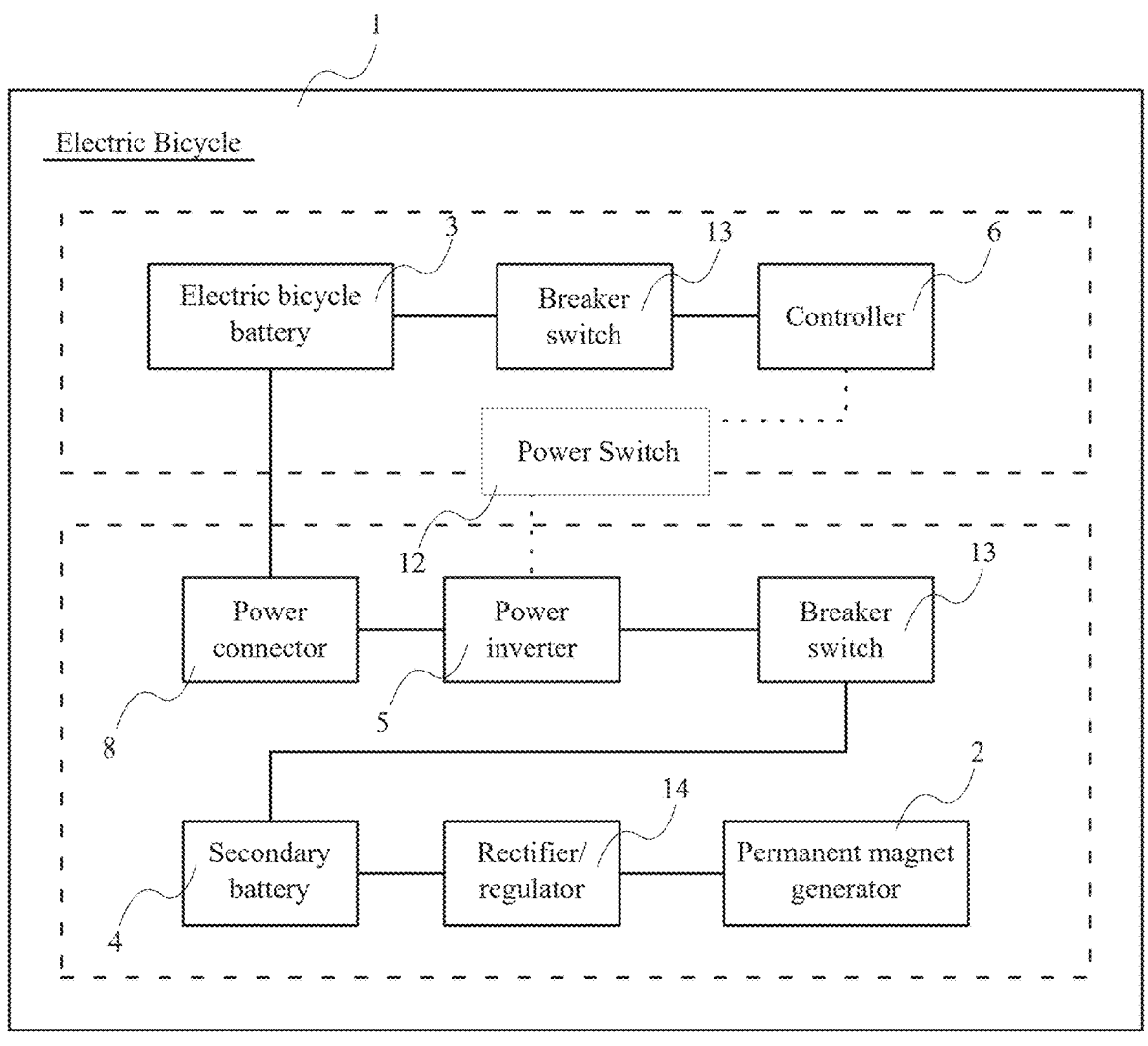
FIG. 3 is a schematic view showing the electronic and the electrical connections of the present invention, wherein the system of the present invention is shown including electrical safety features, wherein the electronic connections are shown in dotted lines, and wherein the electrical connections are shown in solid lines.

Once the generated AC electricity is converted into DC electricity by the power inverter 5, the DC electricity can be used to recharge the electric bicycle's battery 3 via a power connector 8. Accordingly, a subprocess of the present invention comprises the steps of providing a power connector 8 and enabling the power connector 8 to establish an electrical connection between the electric bicycle battery 3 and the power inverter 5. As can be seen in FIG. 1 and FIG. 3, the power inverter 5 is electrically connected to the electric bicycle's battery 3 via the power connector 8. Preferably, the power connector 8 is a charging system. More specifically, the power connector 8 can be any charger connector that is suitable for the electric bicycle's battery. For example, the power connector can be a 96 V lithium battery charger with 108 V peak and five amps. In addition, the electric bicycle's battery 3 can include a Battery Management System (BMS). In other embodiments, different power connections can be utilized to accommodate specific electric batteries.

As previously discussed, the present invention enables users to control the operation of the system by selecting the mode of operation of the system. More specifically, the controller 6 allows the user to switch between different modes of operation. Thus, the overall method of the present invention continues by prompting a user of the electric bicycle to select a corresponding mode of operation with the controller, wherein the corresponding mode of operation is from the plurality of modes of operation (Step G). In other words, the controller 6 allows for different modes of operation to be implemented for the system of the present invention. According to the preferred embodiment, the overall method comprises charging the electric bicycle battery with the DC electricity while the bicycle is in motion, if the user has selected a charging mode as the corresponding mode of operation (Step H). That is, in the bicycle charging mode, the controller activates the power inverter 5 to allow the electric bicycle's battery 3 to be charged by the generated DC electricity while the bicycle is in motion. Further, the controller 6 may include safety features that automatically switch the power inverter off once the electric bicycle's battery is fully charged.

Continuing with the preferred embodiment, the overall method further includes deactivating the power inverter 5 by the controller 6 and charging the secondary battery 4 with the generated AC electricity while the bicycle is in motion, if the user has selected a battery charging mode as the corresponding mode of operation (Step I). In other words, in the battery charging mode, the controller 6 deactivates the power inverter 5 so that the secondary battery 4 is charged by the generated AC electricity while the bicycle 1 is in motion. The secondary battery 4 is charged in this mode so that the electric bicycle's battery 3 can be charged afterwards.

Furthermore, the overall method comprises activating the power inverter 5 by the controller 6 and allowing the electric bicycle's battery 3 to be charged while the bicycle is not in motion, if the user has selected a standalone mode, as the corresponding mode of operation (Step J). In other words, in the standalone mode, the controller 6 activates the power inverter 5 to allow the electric bicycle's battery 3 to be charged when the bicycle is not in motion. The secondary battery 4 can provide a three-hour charge time to allow the electric bicycle's battery 3 to be charged when the electric bicycle 1 is not in use so that the electric bicycle 1 is fully charged and ready to be used. In other embodiments, different modes of operation can be implemented to provide additional functionality for the electric bicycle 1.

Figure 4:
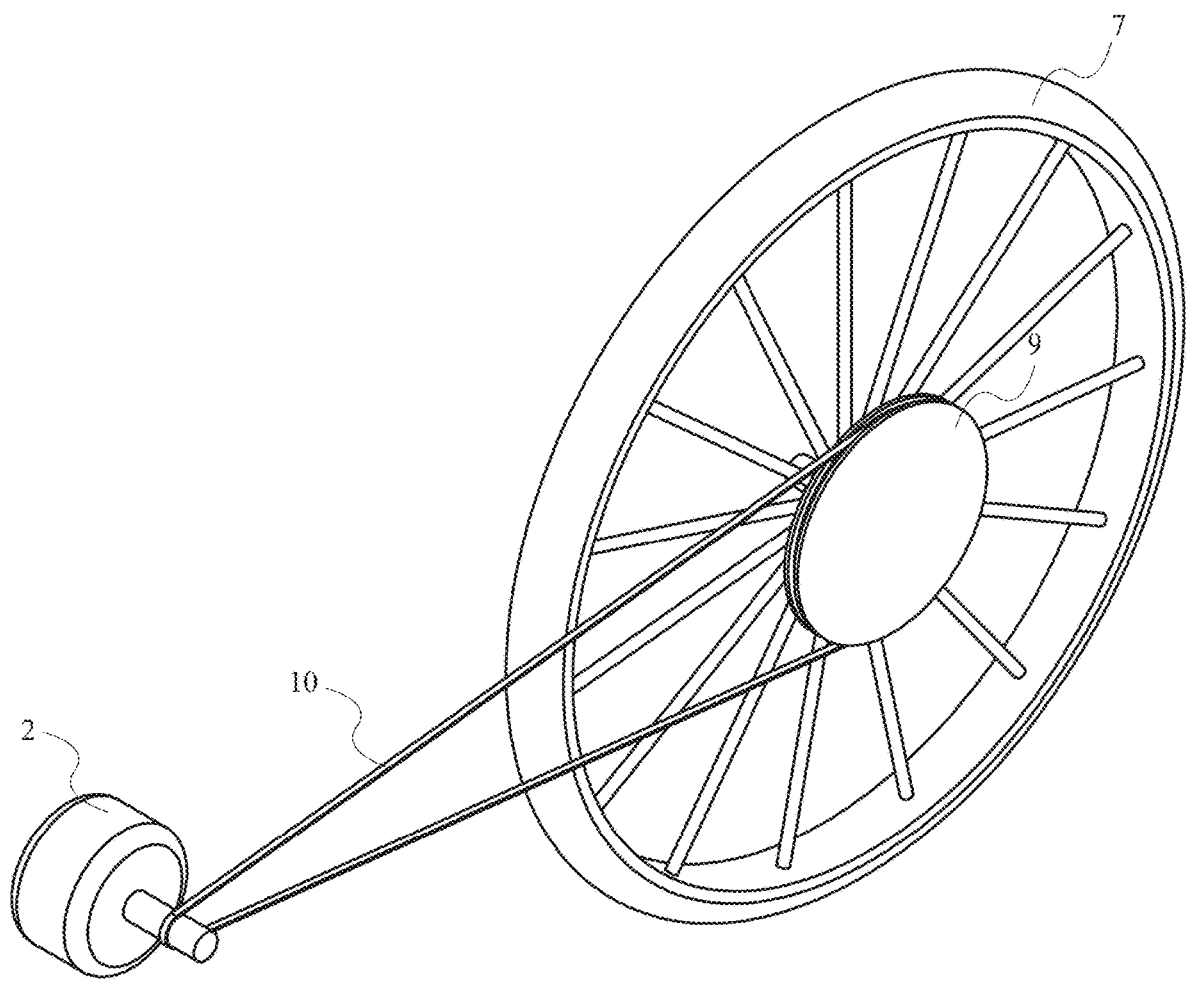
FIG. 4 is a top-front perspective view showing the permanent magnet generator of the present invention connected to an electric bicycle wheel.
Figure 5:
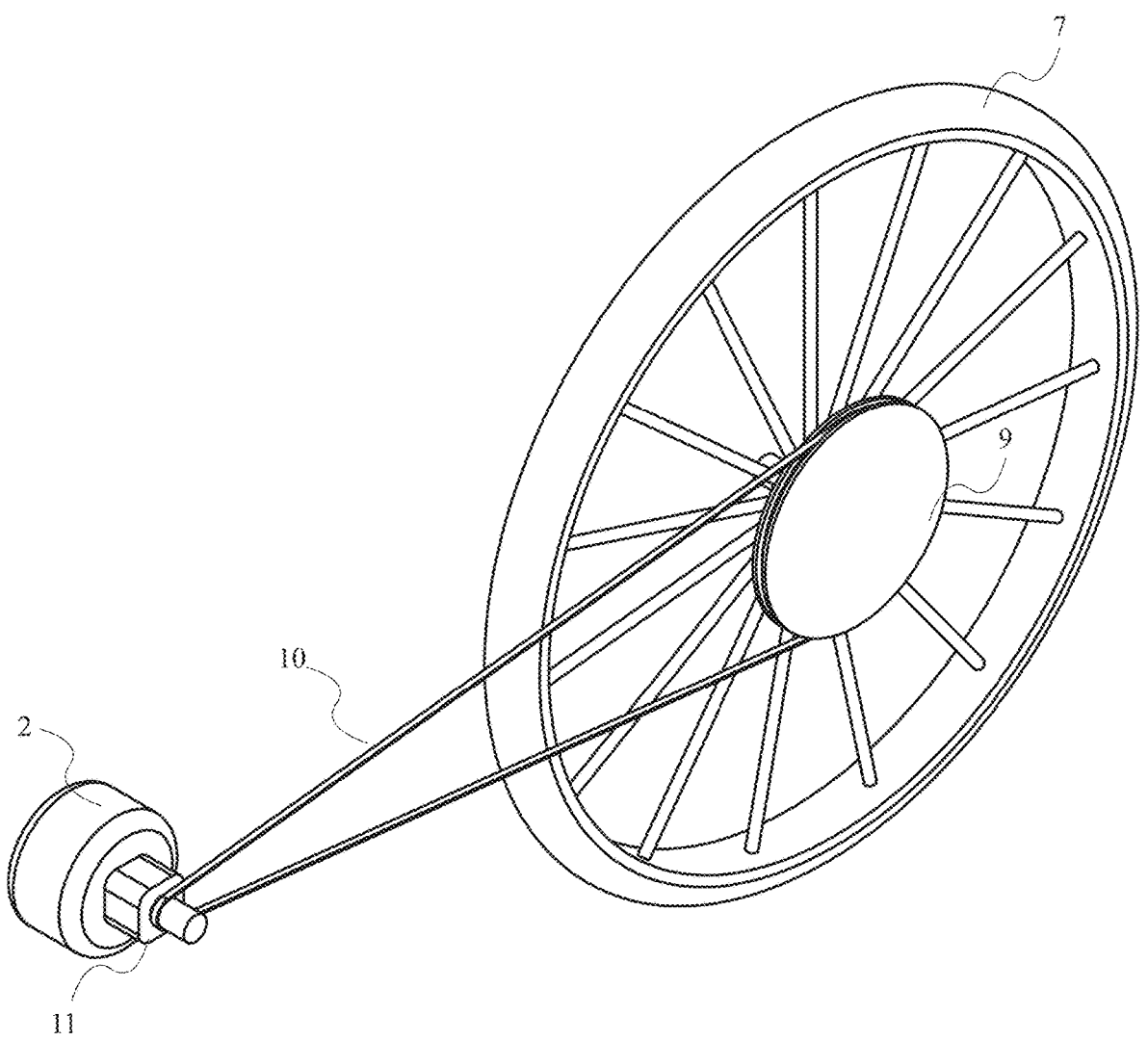
FIG. 5 is a top front perspective view showing the permanent magnet generator of the present invention connected to an electric bicycle wheel, wherein the permanent magnet generator includes a gear box/torque converter.

Continuing with the preferred embodiment, and in reference to FIG. 4 and FIG. 5, a sub-process of the present invention comprises the steps of providing a pulley 9 and a belt 10, wherein the pulley 9 is mechanically mounted onto a wheel hub of the electric bicycle 1. The sub-process continues by operably connecting the belt 10 between the pulley 9 and the permanent magnet generator 2, wherein the rotational energy of the pulley 9 is transferred to the permanent magnet generator 2 through the belt 10. For example, an 8-inch (in.) or 10 in. pulley can be connected to the electric bicycle's wheel hub. In addition, a belt, such as a v-belt, can be used to connect the pulley to a rotor 11 of the permanent magnet generator 2 to transfer the rotation of the electric bicycle's wheel to the rotor 11 of the permanent magnet generator 2. In other embodiments, the permanent magnet generator 2 can be replaced with an alternator. The permanent magnet generator 2 is preferably connected to the rear wheel of the electric bicycle, and the belt utilized is separate from the electric bicycle's roller chain. Further, the permanent magnet generator 2 is mounted onto a section of the electric bicycle's frame adjacent to the rear wheel. Alternatively, the permanent magnet generator 2 can be secured to the front section of the electric bicycle's frame if the permanent magnet generator is rotatably connected to the front wheel of the electric bicycle 1. Furthermore, the permanent magnet generator 2 can be rotatably connected to the belt via a gear box or torque converter to drive the rotor of permanent magnet generator at higher Revolutions per Minute (RPM).

According to the preferred embodiment, a sub-process of the method of the present invention comprises the steps of providing a power switch 12 and enabling the power switch 12 to control the operations of the controller 6, wherein the controller 6 is electronically connected to the power inverter 5 through the power switch 12. More specifically, as can be seen in FIG. 1 and FIG. 3, the controller 6 is electronically connected to the power inverter 5 via the power switch 12. This way, the controller 6 can change the operation of the system according to the mode of operation. In some embodiments, the controller 6 can be the electric bicycle's controller. However, the electric bicycle's controller may be modified to handle continuous long drives. The controller components can be exposed to high temperatures due to prolonged use, so bigger caps and better thermal compounds on the cooling plate can be beneficial. So, the modified controller can be an 84 V, 100-amp controller.

Further, a secondary breaker switch can be implemented to protect the controller 6 from overload. Furthermore, appropriate wiring, such as 10 American Wire Gauge (AWG) wires can be utilized in the system to handle high temperatures generated during the operation of the system. In other words, a sub process of the overall method comprises the steps of providing a breaker switch 13 and enabling the breaker switch 13 to protect the controller 6 from overload, wherein the breaker switch 13 is connected between the controller 6 and the electric bicycle battery 3.

In some embodiments, depending on the type of permanent magnet generator/alternator implemented, a power rectifier or voltage regulator 14 can be implemented. Thus, a sub-process of the overall method may comprise the steps of providing a voltage regulator 14 and enabling the voltage regulator 14 to provide a stable supply of AC from the permanent magnet generator 2 to the secondary battery 4.

Although the invention has been explained in relation to its preferred embodiment, it is to be understood that many other possible modifications and variations can be made without departing from the spirit and scope of the invention as hereinafter claimed.

What is claimed is:

1. A method of self-recharging an electric bicycle comprising the steps of:

(A) providing an electric bicycle, a permanent magnet generator, and electric bicycle battery, a secondary battery, a power inverter, and a controller;

(B) providing a plurality of modes of operation for the electric bicycle;

(C) attaching the permanent magnet generator to a corresponding wheel of the electric bicycle, wherein the permanent magnet generator is rotatably connected to the corresponding wheel;

(D) generating alternating current (AC) electricity by the permanent magnet generator based on the rotation of the corresponding wheel;

(E) charging the secondary battery with the generated AC electricity, wherein the secondary battery is electrically connected to the permanent magnet generator and the power inverter;

(F) converting AC electricity generated by the permanent magnet generator into DC (direct current) electricity by the power inverter;

(G) prompting a user of the electric bicycle to select a corresponding mode of operation with the controller, wherein the corresponding mode of operation is from the plurality of modes of operation;

(H) charging the electric bicycle battery with the DC electricity while the electric bicycle is in motion, if the user has selected a charging mode as the corresponding mode of operation;

(I) deactivating the power inverter by the controller and charging the secondary battery with the generated AC electricity while the electric bicycle is in motion, if the user has selected a battery charging mode as the corresponding mode of operation; and (J) activating the power inverter by the controller to allow the electric bicycle battery to be charged while the electric bicycle is not in motion, if the user has selected a standalone mode, as the corresponding mode of operation.

2. The method of claim 1 further comprising:

providing a power connector; and enabling the power connector to establish an electrical connection between the electric bicycle battery and the power inverter.

3. The method of claim 2, wherein the power connector is a charging system.

4. The method of claim 1, wherein the permanent magnet generator is mounted onto a section of the electric bicycle's frame adjacent to the corresponding wheel.

5. The method of claim 1 further comprising:

providing a pulley and a belt; and mechanically mounting the pulley onto a wheel hub of the electric bicycle; and operably connecting the belt between the pulley and the permanent magnet generator, wherein the rotational energy of the pulley is transferred to the permanent magnet generator through the belt.

6. The method of claim 1, wherein the electric bicycle battery, the secondary battery, the power inverter, and the controller are mounted within a frame of the electric bicycle.

7. The method of claim 1, wherein the controller allows the user to switch between different modes of operation.

8. The method of claim 1 further comprising the steps of:

providing a power switch; and enabling the power switch to control the operations of the controller, wherein the controller is electronically connected to the power inverter through the power switch.

9. The method of claim 1 further comprising the steps of:

providing a breaker switch; and enabling the breaker switch to protect the controller from overload, wherein the breaker switch is connected between the controller and the electric bicycle battery.

10. The method of claim 1 further comprising the steps of:

providing a voltage regulator, and enabling the voltage regulator to provide a stable supply of AC from the permanent magnet generator to the secondary battery.

11. The method of claim 1, wherein the controller automatically switches the power inverter off once the electric bicycle battery is fully charged.

* * * * *